United States Patent [19]

Legare

[11] Patent Number: 4,996,970

[45] Date of Patent: Mar. 5, 1991

[54] HEATED SLEEPING BAG GROUND PAD

[76] Inventor: David J. Legare, 11 Bonnie Ave., New Hartford, N.Y. 13413

[21] Appl. No.: 431,158

[22] Filed: Nov. 3, 1989

[51] Int. Cl.$^5$ ............................................. A61F 7/00
[52] U.S. Cl. .................................. 126/205; 126/9 R; 126/204; 126/210
[58] Field of Search ............... 126/204, 205, 206, 207, 126/208, 209, 210; 5/421, 112, 417, 420

[56] References Cited

U.S. PATENT DOCUMENTS

| | | | |
|---|---|---|---|
| 385,865 | 7/1888 | Lewis | 126/205 |
| 745,785 | 12/1903 | Coates | 126/210 |
| 2,802,088 | 8/1957 | MacCracken | 126/210 |
| 3,572,314 | 3/1971 | Teague, Jr. | 126/210 |
| 3,894,213 | 7/1975 | Agarwala | 126/204 |
| 3,898,980 | 8/1975 | Reimann | 126/9 R |
| 4,118,946 | 10/1978 | Tubin | 126/204 X |
| 4,535,753 | 8/1985 | Zayauskas | 126/9 R |
| 4,572,188 | 2/1986 | Augustine et al. | 126/204 X |
| 4,685,442 | 8/1987 | Cieslak | 126/204 |

Primary Examiner—Larry Jones
Attorney, Agent, or Firm—Katherine McGuire

[57] ABSTRACT

A backpack-transportable, heated sleeping bag ground pad is provided for the hiker/camper which is extremely compact, simple to use and which may incorporate a variety of conventional outdoor heat sources, such as a campfire or simple kerosene or alcohol lamp, for example. The system basically includes a heating reservoir and miniature, battery-operated pump system to circulate heated water through flexible plastic tubing embedded in a standard sleeping bag ground pad.

28 Claims, 4 Drawing Sheets

FIG. 1

HEATED SLEEPING BAG GROUND PAD

REFERENCE TO RELATED DISCLOSURE DOCUMENTS

The present application is based in whole or in part on related Disclosure Documents No. 212482, dated Oct. 17, 1988, now U.S. Pat. No. 4,891,669 and No. 221175, dated Feb. 23, 1989 pending.

BACKGROUND OF THE INVENTION

This invention relates to active heating methods to provide a more comfortable cold weather sleeping environment for individuals participating in outdoor activities such as backpacking, hunting, camping, etc., and more particularly, to a novel and unique fluid heat transfer system for supplying heat to the type of foam or inflatable ground pad typically used under a sleeping bag for camping.

The use of fluid heat transfer to regulate the temperature of a bed is well known in the prior art. The general implementation of this method in a typical embodiment consists of an external heating system and a water circulation system which carries the heated water through tubing embedded within a mattress. A number of unique devices using these basic principles have been disclosed in the prior art, much of which dates back to the 1800's and early 1900's. These inventions were generally intended for fixed-place, in-door use, and as such, do not appear to be in great demand today where simple and efficient home heating is no longer a problem. This is evident even for the most recent inventions such as described by U.S. Pat. No. 3,438,069, issued to Long on Apr. 15, 1969, and No. 4,242,766, issued to Allegro on Jan. 6, 1981.

People familiar with outdoor activities such as backpacking, hunting, etc., which may involve camping outdoors, realize that even moderately cold temperatures can become a formidable problem, even when compensated for by warm clothing and well insulated sleeping gear. This is simply because it is very difficult to control the ambient temperature inside a thin-walled, non-insulated enclosure, such as a tent. Although a number of products such as kerosene or propane powered radiant heaters have been developed to mitigate this problem, these devices are generally cumbersome, inefficient, and dangerous due to the potential fire and asphixiation hazards they create. Furthermore, the radiant heat generated by such devices is insufficient to appreciably raise the surrounding ground temperature, and consequently does nothing to reduce the conductive loss of body heat to the surface beneath the sleeping bag. Existing portable foam and inflatable ground pads are designed to reduce conductive heat loss strictly by virtue of their insulating properties, and are therefore only partially effective in this regard.

It is therefore a main object of the present invention to provide a heating capability incorporated into a standard, backpack-transportable, sleeping bag ground pad.

Another object is to provide a sleeping bag heating system which is sufficiently compact and light such that it is totally portable within the general shape and volume of the basic ground pad while adding no more than a few pounds of extra weight to a backpack on which it is carried.

Still another object is to provide a sleeping bag heating system which is completely safe, and extremely simple and quick to assemble and operate in any outdoor environment.

Other objects will in part be obvious and will in part appear hereinafter.

SUMMARY OF THE INVENTION

The invention provides a closed heat delivery system to maintain a sleeping bag ground pad at a temperature which is substantially higher than the average ground temperature, thereby creating a more comfortable effective ground temperature beneath the sleeping bag and its occupant.

The system includes a relatively small, compact closed heating reservoir which is essentially flat in shape, and which consists of a lower heat transfer surface and an upper surface containing a pump mechanism, heat switch, connecting tubes, and fill hole with a removeable cap. The lower heat transfer surface consists of a fire tolerant, thermally conductive material such as aluminum, stainless steel or copper. The upper surface preferably consists of a durable plastic such as polypropylene or polyethylene. As such, the upper surface could be easily manufactured via a standard molding process while the lower heating surface could be stamped or otherwise formed from a medium gauge metal sheet. Narrow sides are included to separate and attach to both the upper and lower surface. These sides could be made as an individual part(s), or could be integral to either one or both surfaces. For example, the lower surface could include integral sides which connect the two surfaces with a detachable or permenent seam; in the former case, the upper surface could be attached to the sides of the lower surface in similar fashion to a snap-on lid, which would furthermore be sufficiently secure to prevent leakage from the reservoir. The reservoir perimeter is essentially flat in shape to maximize the ratio of the heat transfer surface area to fluid volume. This allows more efficient energy transfer from the heat source and furthermore minimizes required weight and volume of the reservoir. Heat is applied to the heating surface of the reservoir from a number of possible, convenient sources, such as a kerosene or alcohol lamp, small stove, container of hot water, or camp fire. The heat transfer fluid consists of water or some type of water and alcohol or antifreeze mixture for use at temperatures below 32° F. Also included within the system is a pump mechanism to circulate the fluid, and a thermally activated switch in series with the pump motor and its electrical power source (D or C cell batteries). The system furthermore includes a standard ground pad with flexible plastic or rubber tubing embedded therein. Another section of tubing connects the ground pad to the reservoir. Both the connecting segment and embedded segment of tubing could consist of one continuous piece, or could consist of two sections joined by detachable connectors, thus allowing the ground pad to be separated from the reservoir. It should also be noted that the ground pad tubing segment could be provided without the standard ground pad by laminating it between two thin sheets of flexible plastic, such as polyethylene, for example. As such, it could be used in conjunction with a standard, non-heated ground pad by simply placing it on said ground pad to provide the same basic capability as if it were permanently integrated into the ground pad. However, further discussion will only assume the embedded configuration, for simplicity of the description. The tubing therefore provides a circuit by which the fluid may be continuously circulated between the ground pad and the heating reservoir by the pump located within the reservoir. It is also seen that a sufficiently long connecting tube segment allows the heat source to be safely located remote from the ground pad to eliminate any danger of fire or asphixiation to a person using the system. The tubing has been strategically embedded within the ground pad so as to cause an even dispersion of the tranferred heat over its surface. Once it has traveled through the embedded tubing in the pad, and transfered a substantial amount of its heat, the fluid exits through a return tube and travels back to the reservoir where it is again heated and pumped back through the system.

The mechanism of energy transfer between the heat source and the reservoir depends on the particular type of heat source to be used. For a low power combustion source such as a small alcohol lamp, convective transfer is most desirable via direct contact of the heating surface with the flame. Radiative heat transfer is most appropriate when a campfire is used as the heat source. Finally, conduction, or direct contact between the reservoir heating surface and the heat source is required for sources such as an open pan of hot water, or moderately hot sources such as the top of a propane lantern or the surface of an enclosed container of embers from a campfire.

The heat switch is either embedded within or in direct thermal contact with the upper surface of the reservoir. The switch is necessary to ensure that cold water will not circulate through the ground pad. As such, the switch is normally open until the fluid temperature inside the reservoir reaches the threshhold level, at which point the switch closes, thus causing the heated fluid to be circulated. Shortly after the heat source expires, the switch opens as the water temperature drops below the threshhold temperature. It should be noted that the temperature at which the switch opens is usually somewhat lower than that at which it closes. This is typically the way these devices operate, and is furthermore desirable for the operation of this system due to the obvious immediate temperature drop that occurs when the switch closes at the beginning of system operation, causing a surge of cold fluid to enter the reservoir. Therefore, it is clear that the switch automatically protects against the circulation of fluid when the temperature inside the reservoir falls below that at which the switch opens, and therefore protects against the circulation of cold fluid, regardless of how long the heat source lasts. A number of standard commercially available heat switch devices may be used for this purpose.

A collapsible stand is also provided with means to releasably mount the heating reservoir thereon. The stand is essentially folded flat in the closed position, and consists of four trapezoidally shaped panels positioned at a somewhat less than 45 degree angle to the vertical when opened for use. The reservoir is mounted over the rectangular opening formed by the top of the four panels. The stand could be assembled in a number of ways while still providing the basic required functionality. One of these entails providing the four panels as seperate pieces which snap together, or are otherwise secured together along their respective sides. Another includes hinging the sides together with a means of locking the hinges for stability in the open position, or using hinges in combination with a frame (at the top rectangular opening) to provide this stability. Only the latter method is described in detail below. However, other such methods of assembly as described previously will become obvious from the following description and drawings. It will furthermore be obvious in the ensuing description and drawings that a number of methods (besides the example given) of attaching the reservoir to the stand are also possible. Therefore, the stand may be constructed so that two opposing panels are hinged to a rectangular rigid frame which actually forms the opening over which the reservoir is attached via two parallel channels, for example, on the frame which receive respective flanged edges of the reservoir. The other two opposing panels of the stand are attached via hinges to opposite edges of one of the panels that is attached directly to the frame. Therefore, the stand is set up by clamping the unhinged edges of these two panels to the respective opposite edges of the opposing frame-hinged panel. The reservoir can now be attached to the frame. One of the aforementioned frame-hinged panels further includes an adjustable fold-out leg such that the stand may be positioned upon its side, the purpose of which will be more fully explained below.

With the reservoir mounted on the stand in the horizontal position, a number of diverse low power heat sources such as a simple alcohol or kerosene lamp can be positioned under the stand so that the flame contacts the heat transfer surface of the reservoir. If a campfire is the desired heat source, the stand may be set on its side at a predetermined angle using the aforementioned adjustable fold-out leg as support means. The stand is placed an appropriate distance from a camp fire with its open end facing the fire, as will be seen more clearly in the drawings. In this position the heat transfer surface of the reservoir intercepts radiant heat from the fire. The side panels of the stand furthermore serve to reflect additional heat onto the reservoir heating surface and to reduce convective heat losses.

A number of conductive heat transfer methods may be accomplished without the use of the stand. For example, the reservoir may be placed in direct contact with a number of other available moderately hot surfaces such as the top of a propane lantern or a closed container of embers from the campfire. However, some such hot surfaces may have to be insulated to some degree to prevent the reservoir temperature from getting too high. This obviously also applies to the other aforementioned heating methods, in which case the size of the lamp flame or distance from the fire will have to be gauged so as to provide the desired operating temperature of the heating system. A particular conductive heat transfer method involves placing the heat transfer surface in direct contact with a separate source of heated water. This method may be most readily implemented by the addition of some type of bouyancy to the top surface of the reservoir so that it may be floated in a container of hot water, thus allowing only the heat transfer (lower) surface to contact the water. This floatation would most likely take the form of a waterproof light weight foam cover made of material such as polyesterene, which is removable and which also attaches securely to the reservoir. This cover would provide the additional benefit of reducing unwanted heat loss from the system, and thus could remain attached for all contemplated modes of heating the reservoir. As such, the foam cover is an option which may provide more flexibility in the use of the system.

DETAILED DESCRIPTION

Figure 1:
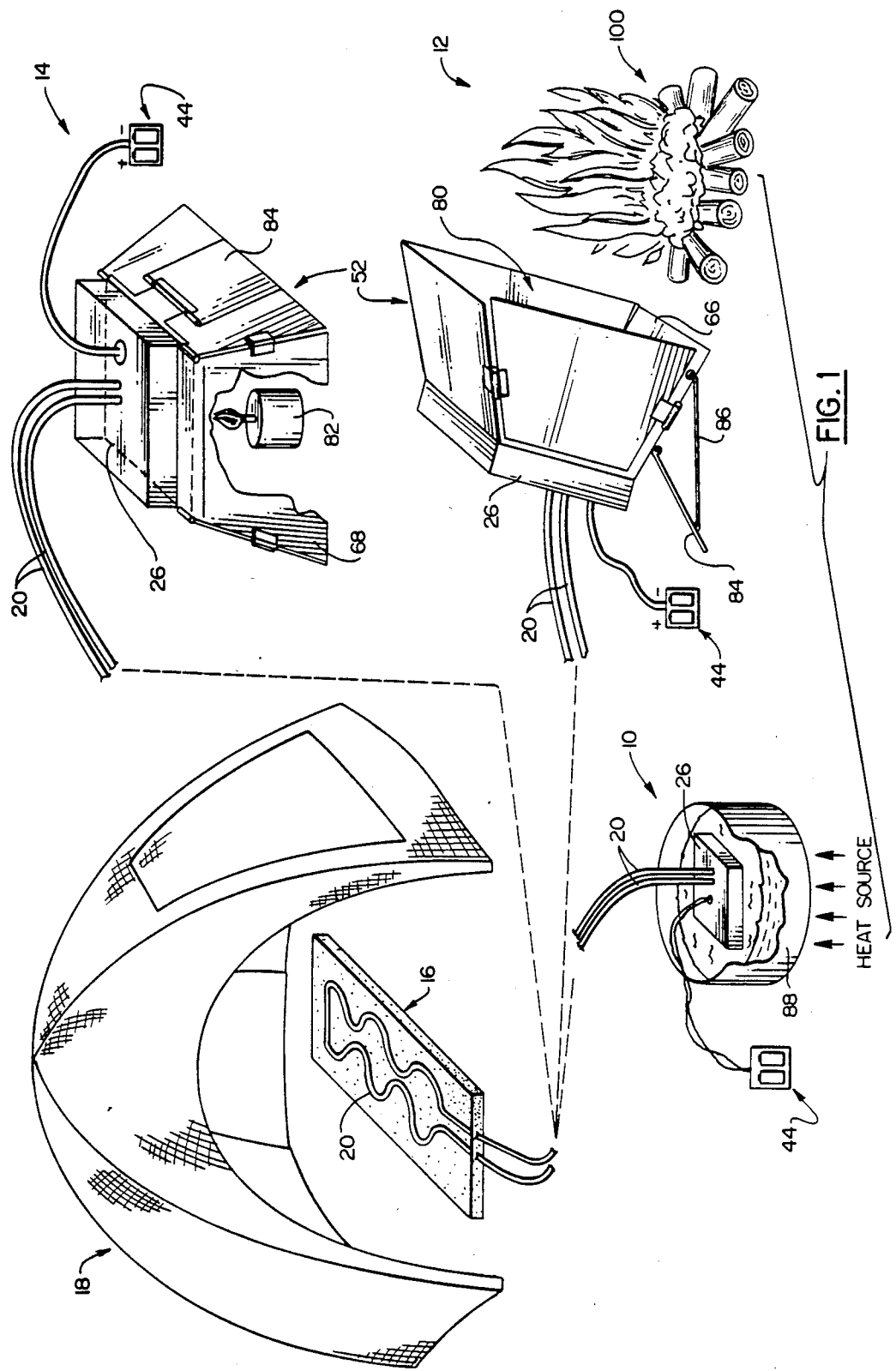
FIG. 1 is a perspective view of the invention showing three alternative methods of applying heat to the heating surface portion of the reservoir which is shown in detached relation to the ground pad portion.

Referring now to the drawings, there is seen in FIG. 1 the basic form and usage modes of the invention. Three alternative heating methods are generally indicated by reference numberals 10, 12 and 14, and will be discussed more fully in the ensuing description.

The intended purpose of the invention is to provide a standard type backpack-transportable sleeping bag ground pad which has integrated into it a heating capability. As such, the ground pad will not only insulate against heat loss, but will also provide active compensation for low ground temperatures by generating a higher temperature, thermal layer beneath the sleeping bag. The complete apparatus is specifically designed to be extremely compact and simple to operate, so as to create virtually little or no additional work for the backpacker, camper, or anyone other user of the apparatus. The unit is furthermore extremely practical in that it is adapted to receive heat from any number of conventional outdoor heating sources.

Figure 4:
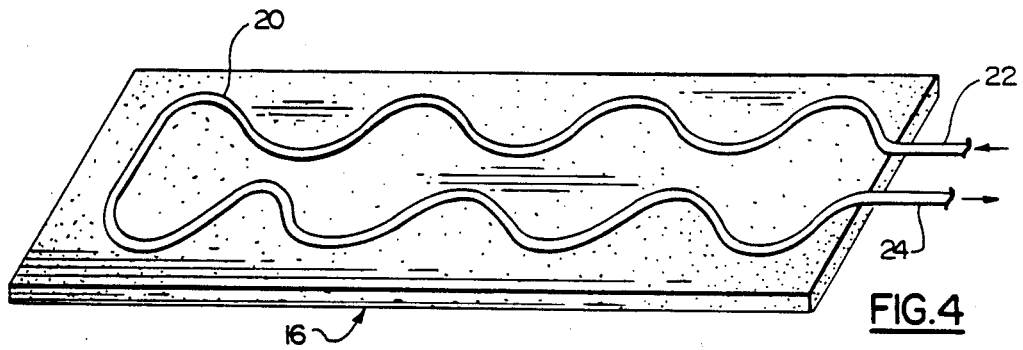
FIG. 4 is a perspective view of the ground pad portion of the invention showing the embedded tubing.
Figure 7:
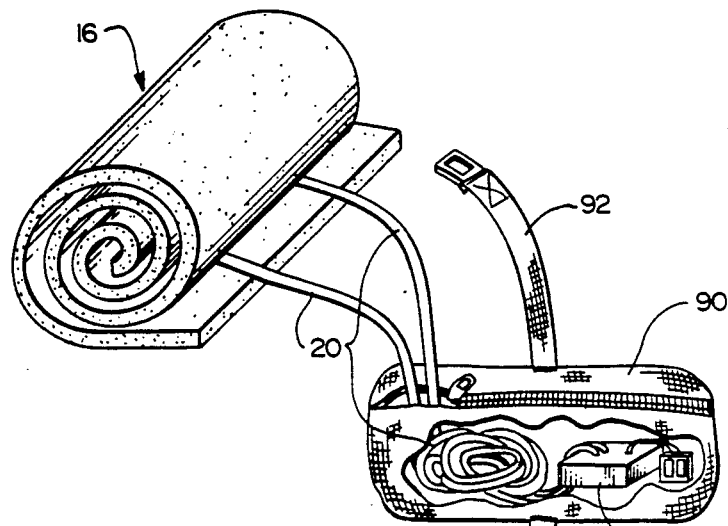
FIG. 7 is a perspective view showing a convenient means of transporting the heated sleeping bag ground pad system, with the ground pad portion in its rolled up position, the fluid transfer tubes extending therefrom and held in a carrying pack (shown partly cut away) which also contains the reservoir, stand, battery pack, and possibly also a small heat source such as a simple alcohol lamp and fuel bottle.
Figure 8:
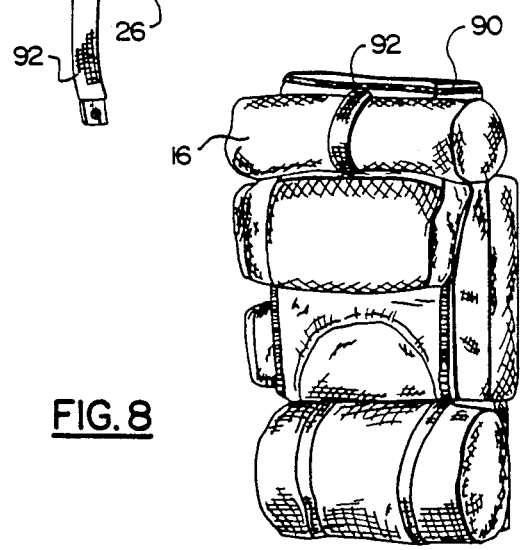
FIG. 8 is a perspective view of a conventional backpack showing the rolled-up ground pad and carrying pack of FIG. 7 attached thereto.

Referring to FIG. 1, ground pad 16 is placed inside a tent 18 or in any other desired location. Ground pad 16 includes fluid transfer tube 20, as seen more clearly in FIG. 4, which is strategically embedded within ground pad 16 such that heat is distributed over an optimal area of its surface. Ground pad 16 is preferably of the plastic or rubber foam type such that it may be rolled up into a small package for ease of carrying, as shown in FIGS. 7 and 8. However, it is contemplated that pad 16 could also be of the inflatable type, with the fluid transfer tube 20 attached to one surface. In this case, the deflated pad could be folded and transported in a similar fashion. It should also be noted that in its simplest form, ground pad 16 could consist solely of the fluid transfer tube 20 laminated between thin sheets of polyethylene, for example. In this form, the heated pad could be used alone under a sleeping bag, but would preferably be used in conjunction with a standard, non-heated ground pad to provide the same basic functionality that would be afforded by embedding the tube 20 in the standard ground pad 16.

Tube 20 is made of a flexible, resilient plastic such as clear vinyl, or rubber material such that it may be tightly coiled for transportation, and yet not completely collapse when weight is placed on ground pad 16. As indicated by the arrows in FIG. 4, the heated fluid enters the ground pad 16 at point 22, circulates through tube 20, and exits at point 24. Tube 20 interconnects to reservoir 26, shown in detached relation in FIG. 1 in connection with different heating means 10, 12 and 14. The portion of tube 20 which is inside the reservoir cavity 32 consists of the two open ends 38 and 40, which respectively attach to the output port of the pump cavity 33, and open into the reservoir cavity 32. Thus, the heated fluid is driven out of the reservoir 26 at point 38, and returns through tube 20 at point 40. It may be desirable to construct the portions of tube 20 over a length of about 4 to 6 inches from the ends 38 and 40 from a more rigid material such as ployethylene or polypropylene. It may furthermore be desirable to use a very flexible material such as thin-walled latex or silicone rubber for the next foot or so to facilitate pinching of the tube for priming the pump, as will be described later. The remainder of the tube 20 could consist of clear vinyl, as described above.

The overall length and internal diameter of the tubing 20 is very important considering the small size of pump motor 42 and the electrical power limitations of the system. In order for the system to remain highly compact and light weight, it must be able to operate for many hours on only a few C or D cell flashlight batteries 44. Furthermore, the fluid flow rate must be sufficient to provide adequate heat transfer. Therefore, tube 20 must not be too long nor too narrow if there is to be adequate fluid flow. As such, the following dimensions of tube 20 have been determined to result in efficient system operation, and are provided as a general guideline to build an operational product: inner diameter, 3/16 to ¼ inches; and total length, 30 to 40 feet, including 10 to 20 feet embedded within ground pad 16.

These dimensions allow ground pad 16 to be remotely located up to approximately 10 to 15 feet or so from the reservoir 26 and heat source 28, which has been proven a reasonably safe, maximum distance, especially if heat source 28 is a camp fire. It should be noted here that the fluid flow rate in tube 20, as measured by the speed of an air bubble in the tube, will generally be approximately several inches per second during normal system operation. Although not shown in the drawings, the section of tube 20 which connects ground pad 16 to reservoir 26 should optimally be insulated to further reduce unwanted heat loss from the system. This insulation can take the form of a thin (e.g., ⅛ inch) foam jacket, or similar layer which may be integral to the surface of tube 20.

Figure 2:
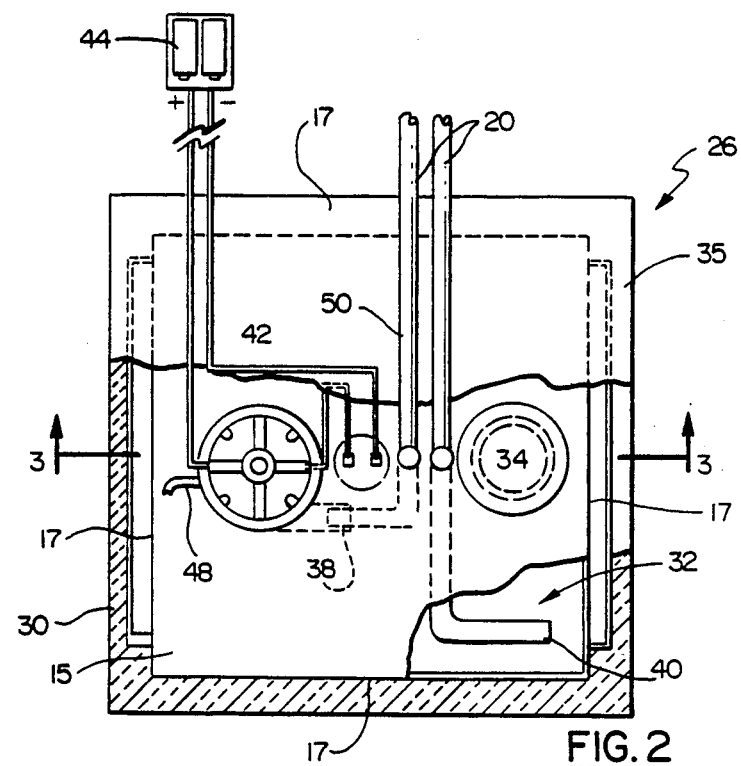
FIG. 2 is a top view of the reservoir showing the pump system, heat switch, circulation tubes, and fill cap, in addition to the optional removable foam insulation cover shown partly cut away.
Figure 3:
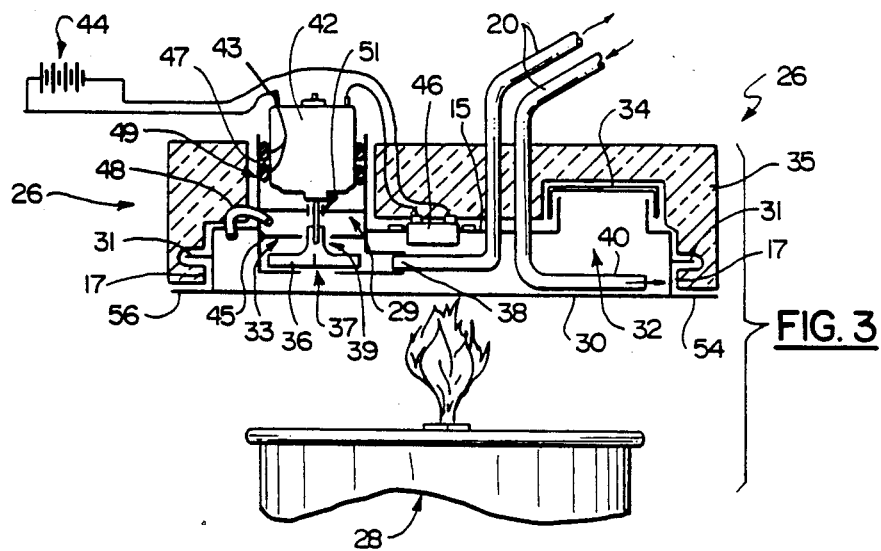
FIG. 3 is a side elevational view in section on line 3—3 of FIG. 2.

Reservoir 26 is shown in more detail in FIGS. 2 and 3. The cross-sectional view of FIG. 3 shows the internal elements and other details of reservoir 26. These include the upper and lower sections, 47 and 45 respectively, of the pump mechanism as shown generally by reference numeral 49, the heat switch 46, flow tubes 20, and filler cap 34. The currently contemplated method for construction of the reservoir 26 is described below. The lower heat conducting surface 30 is formed as a single piece of copper, aluminum, or stainless steel which includes four vertical sides, referenced by numeral 17. The top surface 15 would therefore be molded from a durable plastic such as polypropylene, and would furthermore have vertical edges corresponding to sides 17, which slide over and snap onto sides 17 to form a secure, water-tight seal between the upper and lower halves of reservoir 26. The fill hole, shown beneath cap 34, and holes for portions 38 and 40 of tube 20, bypass tube 48, heat switch 46, and pump mechanism 49, are molded into the top surface 15 during its formation. These openings should incorporate a sleeve which is integral to the molded surface 15 to securely hold the components in place. A rubber sealant or similar material could be used to create a water-tight connection between the edges of the openings and each respective component. It is furthermore noted that the opening in surface 15 for the pump mechanism 49 could incorporate a threaded sleeve which allows pump 49 to be easily removed if necessary. The pump mechanism 49 itself could also be molded from the same or similar material as the surface 15, and be correspondingly threaded to fit therein. The pump mechanism 49 could be manufactured as two seperate pieces which join together when they are screwed into the upper and lower sides, respectively, of the opening in surface 15. As can be seen in FIG. 3, the upper section 47 of pump 49 holds the motor 42, the lower section 45 including the pump cavity 33 and the impeller 36. The chamber 29 is formed where the two pump sections 45 and 47 meet. If manufactured as a single piece, the pump mechanism 49 could similarly be inserted into the surface 15 in a single step. Finally, the heat switch 46 could be incorporated into the surface 15 via a simple indentation on the outer side (unlike what is shown in FIG. 3) without creating a hole completely through the surface 15. Thus, the switch 46 would not have to be in direct contact with the system fluid contained in reservoir 26.

Since it is desired to reduce overall system size and weight, the size of reservoir 26 should also be minimized. This is accomplished by the generally flat shape of reservoir 26, as shown in FIGS. 2 and 3. This general shape maximizes the ratio of the surface area of the heat transfer plate 30 to the volume of reservoir cavity 32, and optimizes the use of both conductive and radiative heat sources. The size of reservoir 26 is therefore determined by the minimum surface area of the heat transfer plate 30 required to maintain the desired system temperature.

The following general dimensions of reservoir 26 have been determined to provide adequate system operation, and are provided as a general guideline for building a useable product: length and width, 6 to 11 centimeters; and height of sides 17, 1 to 2 centimeters. These dimensions are also sufficient to accommodate the components of reservoir 26, such as the pump 49, heat switch 46, tubes 20, and filler cap 34. Consequently, the fluid volume of the reservoir 26 can be kept at around 100 to 150 milliliters. Considering an average volume of 200 to 300 milliliters for the entire length of tube 20, the total system fluid volume can be as low as about 300 to 400 milliliters, resulting in a total system fluid weight of about 10 to 15 ounces.

An opening in the reservoir 26, covered by a removable cap 34, is provided for filling and draining the system. Filling the system with fluid is accomplished by slowly pouring the fliud into reservoir cavity 32 as pump 49 is being run. This process is continued until the reservoir cavity 32 and pump cavity 33 are essentially full, and all of the large air bubbles are out of the tube 20. Draining is accomplished by simply pouring the fluid out of reservoir 26 and suspending the ground pad 16 such that the fluid flows out of the tube 20. The fluid consists of either plain water or some type of antifreeze mixture, depending on the ambient temperature. To begin the heating cycle, a heat source 28 is applied to heating plate 30 of reservoir 26. This transfers heat to the fluid contained in reservoir cavity 32. A centrifugal pump system consisting essentially of a small (1 ounce size) electric DC motor 42, pump cavity 33, and impeller 36 is provided to drive heated fluid which has entered pump cavity 33 from reservoir cavity 32 via open passageway 37, through tube 20, beginning at point 38. The heated fluid circulates through tube 20 and enters ground pad 16 at point 22. After passing through the portion of tube 20 which has been embedded in ground pad 16, the heated fluid, which is now at a lower temperature due to conductive heat transfer to ground pad 16, exits at point 24. The fluid travels to point 40 where it reenters the reservoir cavity 32 and is heated again by heat source 28. This process proceeds in a continuous cycle.

A centrifugal pump appears to be the best means of providing fluid circulation in this system due to its relatively compact size, simplicity, and efficiency. The typical centrifugal pump mechanism of the invention operates by generating fluid pressure against the walls of the pump cavity 33 as a result of the rapid rotation of impeller 36, driven by motor 42. This pressure causes the fluid to flow through the opening in the wall of cavity 33 at point 38. The particular centrifugal pump design chosen for this invention shows new fluid being drawn in through opening 37 directly beneath the center of impeller 36. Referring back to FIG. 3, an additional chamber 29 is seen directly above pump cavity 33. A small, but noticeable gap 39 between the lower wall of chamber 29 and the stem of impeller 36 provides a passageway between pump cavity 33 and chamber 29. This passageway, along with bypass tube 48, facilitates priming of the pump, as will be described below. An additional reason for having a relatively large gap 39 around the stem of impeller 36 is to prevent any friction which would result from an overly tight connection of the elements since any unnecessary load on pump motor 42 would significantly lower its pumping efficiency due to its small size and low power. It can now be seen that the passageway provided by the gap 39, along with bypass tube 48, provides means by which fluid can be initially pushed into pump cavity 33 for priming the pump after fluid has been drained from cavity 33 as a result of intentional draining and refilling of the system, or because reservoir 26 was unintentionally jostled during transport, thereby causing air inside the system to get trapped in pump cavity 33.

Priming the pump can be accomplished by manually pinching tube 20, preferably at a location near reservoir 26, while pump 49 is running, until fluid begins to circulate. This is indicated by a noticeable change in the sound of motor 42, as it slows down due to encountering resistance of the fluid. It should furthermore be noted that chamber 29 is mostly air space since it is above the top of reservoir 26, and because of the pumping operation which draws any water in chamber 29 into pump cavity 33. Referring again to the pumping mechanism 49, it can be seen that the shaft of motor 42 fits through a small opening in the upper side of chamber 29. A very small space 51 is shown between the motor shaft and the side of the opening. Space 51 is large enough to prevent unwanted friction against the shaft of motor 42, yet small enough such that an oil drop placed into it will remain in place by surface tension, thus sealing the motor 42 from all traces of the system fluid, so as to prevent corrosion. It is obvious that the same function could be provided by a small cap over the end of the shaft of motor 42, said cap being directly attached to the end of the motor casing. It is furthermore noted from the drawing that motor 42 is installed by sliding it down into the top section 47 of pump 49. Motor 42 can be secured by a number of means, but in the preferred embodiment, as indicated in FIG. 3, is held in place by rubber seals 43. Motor 42 may also be removed and replaced by either pulling it out of or pushing it into seals 43. It is furthermore noted that the shaft of motor 42 is pushed into the stem of impeller 36 as motor 42 is installed, and that the shaft of motor 42 can also be secured to impeller 36 by a number of means; however, the simplest method appears to be to provide a splined or otherwise vertically grooved surface on the end of the shaft of motor 42 which is securely fit within a rubber seal in the stem of impeller 36. This is sufficient to hold impeller 36 securely in place such that it spins with the shaft of motor 42 without slipping. This overall arrangement furthermore allows motor 42 to be easily removed and replaced if necessary.

One or two standard C or D cell flashlight batteries 44 will provide sufficient power to operate pump 49 based on the other system parameters described above. Motor 42 therefore draws only about 1 watt during normal system operation. As a result of its low power consumption, it is practical to operate pump 49 from batteries which have been recharged during daylight hours from a reasonably small, solar battery charger.

A heat switch 46, connected in series with pump motor 42 and batteries 44, automatically starts and stops fluid circulation at a predetermined temperature threshold. As such, pump 49 turns on when the fluid temperature in reservoir 26 reaches the desired operating level, and turns off when heat source 28 expires such that cold fluid will not circulate through ground pad 16. Heat switches with turn-on temperatures of about 85 to 120 degrees F., and turn-off temperatures of about 60 to 75 degrees F., will work well under most conditions. However, a heat switch with manually adjustable activation temperature settings would provide the greatest flexibility in optimizing system operation over a wide range of ambient temperature conditions. It should be furthermore noted for reference that a comfortable system operating temperature range appears to be from about 80 to 110 degrees F., as measured at the reservoir 26.

Figure 5:
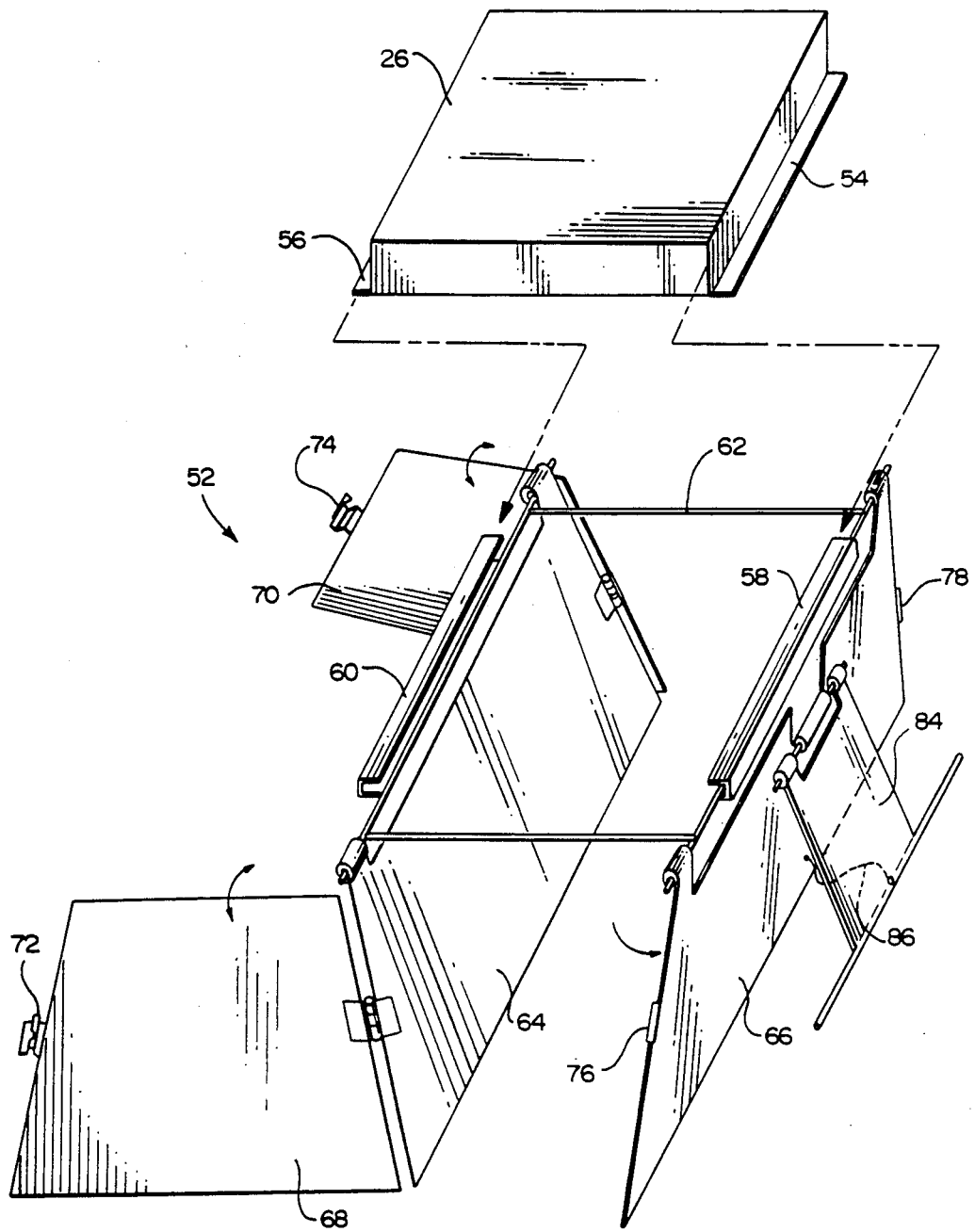
FIG. 5 is a perspective view of the collapsible stand portion of the invention, showing mounting means for the reservoir.
Figure 6:
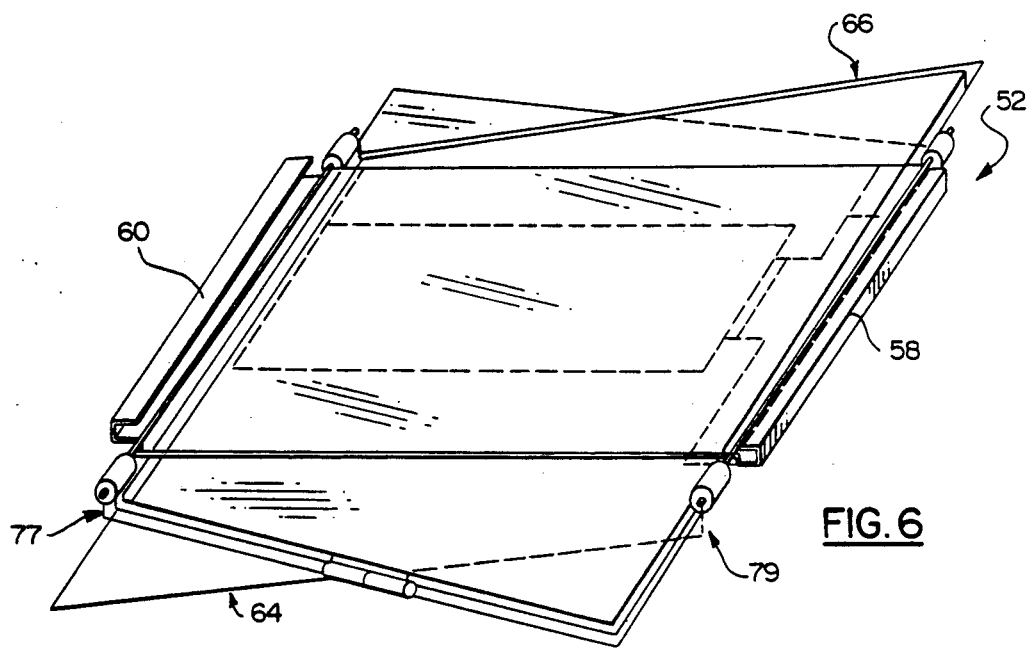
FIG. 6 is a perspective view of the stand in its folded, or collapsed position.

Turning attention now to FIG. 5, there is seen generally a collapsible stand 52 designed to support and hold reservoir 26. One method of mounting reservoir 26 on stand 52 utilizes side flanges 54 and 56 of reservoir 26 which are releasably and slideably engaged into channels 58 and 60 respectively, of rectangular metal rod frame 62. Once mounted, reservoir 26 is secured to stand 52 such that the stand 52 may be placed in any of its operating positions while holding reservoir 26 in place. The basic stand 52 shown in FIGS. 1, 5, and 6 may be constructed and assembled as described below. Other methods of assembling the stand will become obvious from the drawings after understanding its basic functionality, and may be utilized for a particular implementation of the invention. Thus, stand 52, as seen in FIGS. 5 and 6, includes two trapezoidally shaped side panels 64 and 66 that are each hinged along one long edge of the two respective long lengths of metal frame 62. Two additional trapezoidally shaped side panels 68 and 70 are provided, one non-parallel edge of each panel 68 and 70 being hinged to the non-parallel edges of frame-hinged panel 64. The opposite, non-parallel edges of panels 68 and 70 include clamping means 72 and 74 such that they may be releasably attached to respective clamp receiving means 76 and 78 of opposite frame-hinged panel 66. In this way, stand 52 is secured in an open, erected position, as seen in situation 12 and 14 of FIG. 1, from a folded, collapsed position, as seen in FIG. 6. It should be noted here that FIG. 6 reveals right angle bends 77 and 79 at the frame hinge points of panels 64 and 66 which are necessary for folding stand 52 into a flat configuration when stand 52 is assembled with permanently hinged sides as shown. Bends 77 and 79 have been intentionally eliminated from FIG. 5 for clarity of the drawing.

In the open position, the four side panels, 64, 66, 68 and 70, which are constructed of light-weight, thermally reflective material such as aluminum, form an enclosure 80, as best seen in situation 12 of FIG. 1. In this way, when an intense radiative heat source, such as a camp fire, or even a kerosene or propane powered radiative heater, is directed towards enclosure 80, heat impinges directly and by reflection from side panels 64, 66, 68 and 70, upon heat transfer surface 30 of reservoir 26.

As seen in situation 14 of FIG. 1, stand 52 can be placed over a heat source such as a simple alcohol lamp 82. Such a heating device could be as simple as a three or four ounce can filled with ethanol or methanol, with a wick inserted into a filler cap at the top. An approximately 1 inch high flame from the lamp can generally provide a system operating temperature as high as about 50 degrees F. above the ambient temperature within a period of about 5 minutes from the start of system operation. Fuel consumption rates using an alcohol lamp can be as low as 2 hours per ounce of fuel while still maintaining a comfortable system temperature.

As seen in FIG. 5, side panel 66 further includes pull-out leg 84 such that stand 52 may be positioned on its side to receive radiant heat from a campfire, as seen in situation 12 of FIG. 1. Adjustable cord 86 is provided such that the pull-out leg 84 may be set at a desired angle from side panel 66, thereby optimizing the angle at which enclosure 80 receives radiant heat from a campfire, as seen in situation 12 of FIG. 1.

Alternate heat sources may be utilized without the use of stand 52. As seen in situation 10 of FIG. 1, reservoir 26 may be floated in a container of water 88 with a conventional, outdoor heat source applied thereto, thereby heating the water in container 88, which in turn heats the fluid in reservoir 26 through conductive heat transfer. Floatation is possible due to the waterproof foam insulation cover 35 of reservoir 26. Foam cover 35 therefore serves the dual role of insulating reservoir 26 to reduce unwanted heat loss, and also to provide floatation as described above. It can be seen from FIGS. 2 and 3 that foam cover 35 may consist of two symmetrical halves which are attached to reservoir 26 by sliding engagement with flanges 31 on two opposing sides, and which meet at the centerline 3—3 of FIG. 2. Foam cover 35 is therefore easily removed if desired.

Other considerations in the design of the proposed heated ground pad system mainly relate to the reliability of the pump motor 42, heat switch 46, and power source 44. The main concern here is that one of these components will unexpectedly fail, causing pump 49 to stop, with a resultant over-heating of the system fluid to the point that it begins to boil, causing the walls of reservoir 26 to rupture. This potential problem can be avoided by including a simple pressure relief valve, such as a rubber plug, which is either intergral to filler cap 34, or otherwise inserted at some point on upper surface 15 of reservoir 26. However, this problem may be inherently solved by the manufacturing design previously described for the reservoir 26.

Referring back to the design, the fact that the upper surface 15 releasably snaps over the sides 17 of the lower surface 30 allows the two surfaces 15 and 30 to seperate if pressure builds up in the reservoir 26, thus protecting the reservoir 26 from damage, and also preventing a potentially dangerous explosion of reservoir 26. A further optional enhancement to this design would be to provide one or more metal or plastic leaf or coil springs which could be attached to the inside of the reservoir top surface 15, said springs being placed under compression when the upper surface 15 and the lower surface 30 are snapped together. As such, as soon as the surfaces 15 and 30 break apart from the internal fluid pressure, the springs would further thrust the plastic upper surface 15 completely away from the hot, lower surface 30. The final result would be to knock the upper surface 15 completely free so that it falls to the ground, far from the potentially damaging heat being accumulated at surface 30.

Another related consideration may therefore be to make the reservoir components such as the lower section 45 of the pump mechanism 49 out of materials which are not only lightweight, but which can also withstand the significantly higher temperatures which may result from direct application of heat source 28 to surface 30 if and when fluid boils out of reservoir 26. A further consideration concerns the replaceability of fallible components, specifically the motor 42 and heat switch 46. As such, these components should be easy to remove and install on the reservoir 26. This feature has already been described in detail above for motor 42, and can be similarly provided for heat switch 46.

The invention as a whole is very compact and may be easily stored for carrying. For example, in FIG. 7 ground pad 16 is rolled up with embedded tubing 20 extending therefrom and coiled up and placed within zippered carrying case 90, along with reservoir 26, folded stand 52, battery pack 44, and other related system components. Case 90 includes belt 92 such that case 90 may embrace the rolled ground pad 16 such that it essentially blends into its general contour, thereby appearing both in size and weight to be little more than a standard, non-heated, backpack ground pad, as can be seen in FIG. 8.

There is thus provided a unique sleeping bag heating capability which is currently believed to be non-existent in any form in the commercial market. It is furthermore obvious that a number of variations of the heating system described above are possible while still remaining within the intended scope of the invention.

What is claimed is:

1. A back-pack transportable heated sleeping ground pad system comprising:
   (a) a sleeping ground pad;
   (b) a compact heating reservoir comprising:
      (i) a lower, thermally conductive, heat transfer surface adapted to receive heat from a variety of outdoor heating sources;
      (ii) an upper surface parallel to said heat transfer surface and including intergral side walls perpendicular to said upper and lower surfaces, said side walls and said lower surface including cooperative attachment means whereby said upper surface may be attached to said lower surface thereby defining a reservoir cavity for holding a heat transfer fluid therein, said upper surface adapted to receive an electric pump positioned within a pump cavity, said pump cavity and said electric pump communicating with said reservoir cavity; and
   (c) flexible, resilient, elongated tubing through which said heat transfer fluid may be circulated, said tubing having a fluid input end communicating with said pump cavity and a fluid output end communicating with said reservoir cavity, a substantial length of said tubing between said input and output ends strategically embedded within said ground pad for heating an optimal surface area thereof during operation of said system.

2. The invention according to claim 1 wherein said ground pad is of the plastic or rubber foam type.

3. The invention according to claim 1 wherein said ground pad is of the inflatable type.

4. The invention according to claim 1 wherein the total weight of said system is approximately between about two to five pounds, including said heat transfer fluid.

5. The invention according to claim 1 wherein said pump is of the centrifugal type.

6. The invention according to claim 1 wherein said thermally conductive heating surface is aluminum.

7. The invention according to claim 1 wherein said thermally conductive heating surface is copper.

8. The invention according to claim 1 wherein said pump is supplied power from an electric motor driven by a portable battery source attached in series to said motor.

9. The invention according to claim 1 wherein said reservoir cavity includes a fluid fill hole on an upper surface, opposite said heating surface, including a releasable covering cap such that said reservoir cavity may be filled with fluid, and drained when desired.

10. The invention according to claim 9 and further including a pressure relief plug incorporated into said covering cap whereby said walls of said reservoir are protected from rupturing should excessive pressure build up in said reservoir.

11. The invention according to claim 1 wherein said upper surface of said reservoir, said pump mechanism, and said tubing are made of a relatively high temperature plastic whereby they may withstand elevated temperatures associated with continued application of a heat source after said fluid has boiled out of said reservoir cavity due to pump or motor failure.

12. The invention according to claim 1 wherein the external length and width dimensions of said reservoir are substantially greater than the height of said reservoir when said heating surface is placed upon a substantially horizontal surface.

13. The invention according to claim 1 wherein said reservoir cavity is substantially larger in volume than said pump cavity.

14. The invention according to claim 1 and further including an automatic heat switch connected in series with said pump and said power source and in thermal contact with said reservoir cavity such that said heat switch will allow said pump to operate only when said fluid contained in said reservoir cavity rises above a predetermined operating temperature, whereby the flow of cold fluid through said tubing is prevented until said fluid reaches said operating temperature.

15. The invention according to claim 1 wherein the exposed sections of said tubing located between said ground pad and said reservoir include a covering jacket of thermal insulation.

16. The invention according to claim 1 wherein said reservoir includes elongated fins traversing opposite, external sides of said reservoir for receiving a thermally insulating, foam cover having respective internal recesses for releasable attachment to said reservoir, said cover being molded to engage in contact with a substantial external surface area of said reservoir such that said reservoir will float when placed in a container of water.

17. The invention according to claim 1 wherein said upper surface releasably snaps onto said lower surface, said upper surface having flexible edges which snugly slide over said perpendicular side walls, said side walls being integral to said lower surface, to form a watertight seal.

18. The invention according to claim 1 wherein said tubing may be releasably detached from said reservoir.

19. the invention according to claim 1 wherein said tubing has an average inner diameter that is between about 3/16 to ¼ inches, and which has a total length that is between about 30 to 40 feet, with about 10 to 20 feet embedded within said ground pad.

20. The invention according to claim 1 and further including means to prime said pump mechanism.

21. The invention according to claim 20 wherein said priming means comprises a bypass tube with two open ends, one of said ends communicating with said pump cavity and the second of said ends communicating with said reservoir cavity such that said pump mechanism may be manually primed by pinching said tubes at a point adjacent said reservoir to force water to enter said pump cavity while forcing any trapped air out of said pump cavity.

22. The invention according to claim 1 and further comprising a collapsible stand for releasable mounting of said reservoir thereon.

23. The invention according to claim 22 and further comprising a carrying case for the elements of said system in which said reservoir, said tubing, said stand, and the elements thereof are contained within a bag which includes at least two straps attached to two opposing edges of said bag, said straps being fastened around said ground pad when in a rolled-up position, said bag fitting closely around the contour of said ground pad when in a rolled up position to form a package which can be easily transported atop a conventional backpack while adding relatively a small amount of extra weight to said backpack.

24. The invention according to claim 22 wherein said stand comprises four, trapazoidally shaped, side panels and a rectangular rod frame, a first pair of said panels hinged along the shorter edge of the parallel edges of each of said first pair of said panels to the two longest lengths of said rectangular rod frame, the remaining pair of said panels hingedly attached along one of their non-parallel edges to the two non-parallel edges of one of said first pair of panels, the remaining two non-parallel sides of said remaining pair of panels releasably attachable to the opposite, non-parallel edges of the other of said first pair of panels such that said stand may be open to a rigid, standing position from a folded, collapsed position wherein the four said panels are laid upon each other in covering relation.

25. The invention according to claim 24 wherein said side panels are made of a substantially light-weight, thermally reflective material such as aluminum.

26. The invention according to claim 24 wherein one of said panels includes a pull-out, adjustable, support leg such that said stand may be positioned on its side at a predetermined angle when placed upon a substantially horizontal surface whereby said panels form an enclosure which may receive and direct radiant heat toward said heating surface of said reservoir.

27. The invention according to claim 24 wherein said rod frame includes two elongated channels traversing two opposite lengths of said frame.

28. The invention according to claim 27 wherein said reservoir includes two elongated flanges traversing two external, opposite sides of said reservoir for releasable slideable engagement with said channels of said rod frame.

* * * * *